United States Patent
Gao

(10) Patent No.: US 10,534,670 B2
(45) Date of Patent: Jan. 14, 2020

(54) ELECTRONIC DEVICE WITH AUTOMATIC AND STABLE SYSTEM RESTART FUNCTION

(71) Applicant: HONGFUJIN PRECISION ELECTRONICS (TIANJIN) CO.,LTD., Tianjin (CN)

(72) Inventor: Jia-Jun Gao, Tianjin (CN)

(73) Assignee: HONGFUJIN PRECISION ELECTRONICS(TIANJIN)CO.,LTD., Tianjin (CN)

( * ) Notice: Subject to any disclaimer, the term of this patent is extended or adjusted under 35 U.S.C. 154(b) by 214 days.

(21) Appl. No.: 15/859,757

(22) Filed: Jan. 2, 2018

(65) Prior Publication Data

US 2019/0188081 A1 Jun. 20, 2019

(30) Foreign Application Priority Data

Dec. 18, 2017 (CN) .......................... 2017 1 1365858

(51) Int. Cl.
*G06F 11/00* (2006.01)
*G06F 11/14* (2006.01)

(52) U.S. Cl.
CPC .... *G06F 11/1417* (2013.01); *G06F 2201/805* (2013.01)

(58) Field of Classification Search
CPC .......................... G06F 11/1417; G06F 11/1441
See application file for complete search history.

(56) References Cited

U.S. PATENT DOCUMENTS

| | | | |
|---|---|---|---|
| 7,779,310 B2* | 8/2010 | Wei ...................... | G06F 11/0757 714/23 |
| 2005/0024968 A1* | 2/2005 | Lee ........................ | G11C 16/30 365/218 |
| 2008/0068501 A1* | 3/2008 | Hall ...................... | H04N 7/0102 348/496 |
| 2010/0019855 A1* | 1/2010 | Barrow .................. | H03L 7/085 331/1 A |
| 2016/0118121 A1* | 4/2016 | Kelly ................... | G06F 13/4068 710/301 |
| 2017/0241982 A1* | 8/2017 | Dewilde ............ | G01N 33/5014 |
| 2017/0308442 A1* | 10/2017 | Bolt ........................ | H04L 12/10 |
| 2018/0348845 A1* | 12/2018 | Wang .................... | G06F 9/4401 |
| 2019/0163573 A1* | 5/2019 | Chen ................... | G06F 11/0721 |

\* cited by examiner

*Primary Examiner* — Joshua P Lottich
(74) *Attorney, Agent, or Firm* — ScienBiziP, P.C.

(57) ABSTRACT

An electronic device with reliable restart function includes a central processing unit (CPU), a complex programmable logic device (CPLD), and a platform controller hub (PCH). The CPU also outputs a trigger signal when a serious error occurs in the electronic device. The CPLD obtains the trigger signal from the CPU, and delays the trigger signal for a first preset time. The PCH chip obtains the trigger signal delayed by the CPLD, and controls the electronic device to perform a system restart according to the trigger signal.

16 Claims, 3 Drawing Sheets

ELECTRONIC DEVICE WITH AUTOMATIC AND STABLE SYSTEM RESTART FUNCTION

FIELD

The subject matter herein generally relates to electronic devices.

BACKGROUND

When a serious error occurs in a central processing unit (CPU) of a server, the CPU outputs a trigger signal to a platform controller hub (PCH) chip. However, the trigger signal can very easily have conflict with and interrupt the PCH's system management which will prevent the server from restarting.

BRIEF DESCRIPTION OF THE DRAWINGS

Implementations of the present technology will now be described, by way of example only, with reference to the attached figures.

DETAILED DESCRIPTION

Figure 1:
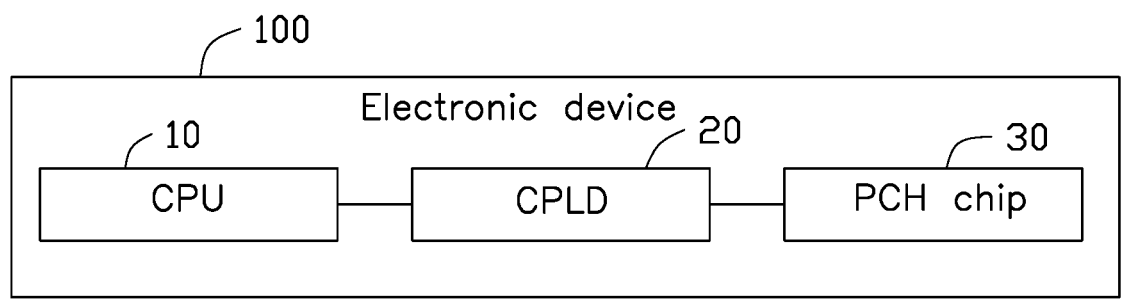
FIG. 1 is a schematic diagram of an exemplary embodiment of an electronic device with a complex programmable logic device (CPLD).

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

Several definitions that apply throughout this disclosure will now be presented.

The term "comprising" means "including, but not necessarily limited to"; it specifically indicates open-ended inclusion or membership in a so-described combination, group, series, and the like.

FIG. 1 illustrates an electronic device 100 in an exemplary embodiment. The electronic device 100 comprises a central processing unit (CPU) 10, a complex programmable logic device (CPLD) 20, and a platform controller hub (PCH) chip 30.

In at least one exemplary embodiment, the electronic device 100 can be a server.

In at least one exemplary embodiment, the electronic device 100 can be a computer or other electronic product.

The CLPD 20 is electrically coupled between the CPU 10 and the PCH chip 30.

The CPU 10 receives a computer instruction and processes the data in the computer software. The CPU 10 also outputs a trigger signal when a serious error occurs in the electronic device 100.

In at least one exemplary embodiment, the trigger signal can be a 160 ns (i.e., $160*10^{-9}$ seconds) low pulse signal.

The CPLD 20 obtains the trigger signal from the CPU 10, and delays the trigger signal for a first preset time.

In at least one exemplary embodiment, the first preset time can be 500 us (i.e., $500*10^{-6}$ seconds).

The PCH chip 30 obtains the trigger signal delayed by the CPLD 20, and controls the electronic device 100 to perform a system restart according to the trigger signal.

Figure 2:
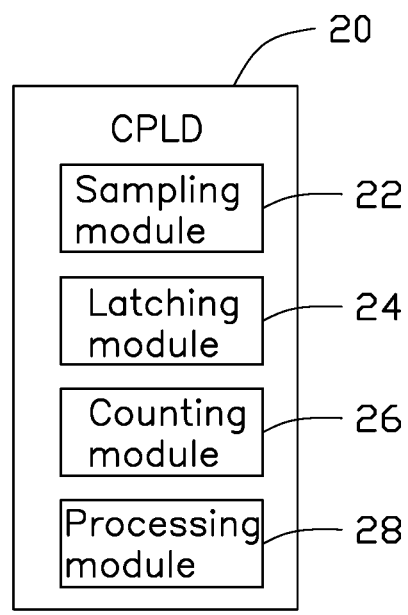
FIG. 2 is a block diagram of the CPLD of FIG. 1.

FIG. 2 illustrates that the CPLD 20 comprises a sampling module 22, a latching module 24, a counting module 26, and a processing module 28.

In at least one exemplary embodiment, the sampling module 22 samples the falling edge and the rising edge of the trigger signal.

In at least one exemplary embodiment, the latching module 24 latches the falling edge and the rising edge of the trigger signal respectively.

When the sampling module 22 samples the falling edge of the trigger signal, the latching module 24 temporarily stores the falling edge of the trigger signal to maintain a certain level state.

When the sampling module 22 samples the rising edge of the trigger signal, the latching module 24 temporarily stores the rising edge of the trigger signal to maintain a certain level state.

In at least one exemplary embodiment, the counting module 26 generates a clock signal of a system clock every second preset time when the latching module 24 latches the falling edge and the rising edge of the trigger signal respectively.

In at least one exemplary embodiment, the latching module 24 latches the rising edge and the falling edge of the trigger signal for the second preset time according to the clock signal of a system clock every second preset time.

In at least one exemplary embodiment, the processing module 28 processes the rising edge and the falling edge of the trigger signal after the latching module 24 has latched the second preset time, and outputs the trigger signal to the PCH chip 30.

Figure 3:
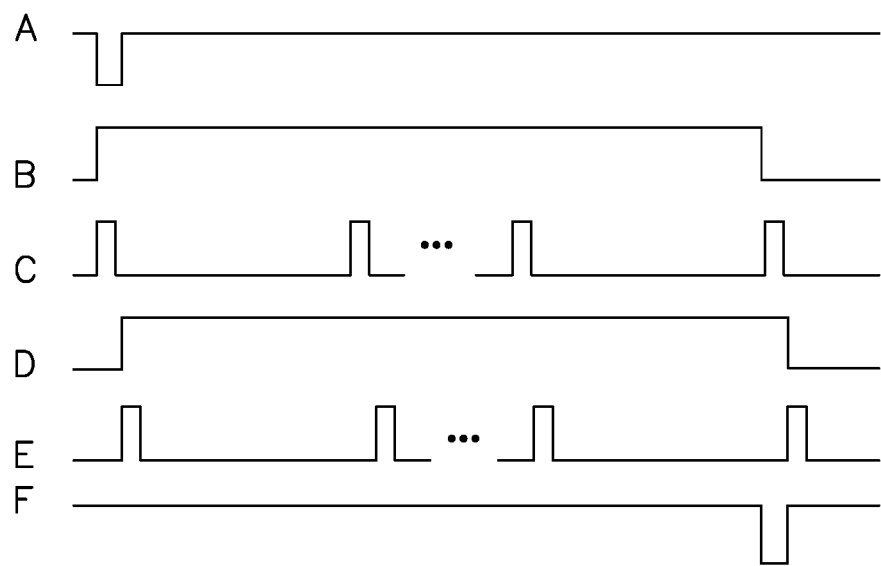
FIG. 3 is a waveform diagram of the CPLD of FIG. 2.

FIG. 3 illustrates that the trigger signal outputted by the CPU 10 has a waveform A. The latch signal latched by the latching module 24 after the falling edge of the trigger signal has a waveform B. The clock signal generated by the counting module 26 when the latching module 24 latches the falling edge of the trigger signal has a waveform C. The latch signal latched by the latching module 24 after the rising edge of the trigger signal has a waveform D. The clock signal generated by the counting module 26 when the latching module 24 latches the rising edge of the trigger signal has a waveform E. The trigger signal obtained after the processing module 28 restores the latched rising edge and the falling edge respectively has a waveform F.

When a serious error occurs in the electronic device 100, the CPU 10 outputs a trigger signal, and the sampling module 22 samples the falling edge and the rising edge of the trigger signal respectively. The latching module 24 latches the rising edge and the falling edge of the trigger signal for the second preset time according to the clock signal of a system clock.

Thus, the processing module 28 processes the rising edge and the falling edge of the trigger signal and outputs the trigger signal to the PCH chip 30. In this way, the electronic device 100 can always restart when a serious error occurs.

The exemplary embodiments shown and described above are only examples. Many details are often found in the art such as the other features of electronic device. Therefore, many such details are neither shown nor described.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. An electronic device comprising:
   a central processing unit (CPU) outputting a trigger signal when a serious error occurs in the electronic device;
   a complex programmable logic device (CPLD) obtaining the trigger signal from the CPU, and delaying the trigger signal for a first preset time; and
   a platform controller hub (PCH) obtaining the trigger signal delayed by the CPLD, and controlling the electronic device to perform a system restart according to the trigger signal.

2. The electronic device of claim 1, wherein the trigger signal is a 160 ns low pulse signal.

3. The electronic device of claim 1, wherein the first preset time is 500 us.

4. The electronic device of claim 1, wherein the CPLD comprises a sampling module, the sampling module samples the falling edge and the rising edge of the trigger signal.

5. The electronic device of claim 4, wherein the CPLD further comprises a latching module, the latching module latches the falling edge and the rising edge of the trigger signal respectively.

6. The electronic device of claim 5, wherein the CPLD further comprises a counting module, the counting module generates a clock signal of a system clock every second preset time when the latching module latches the falling edge and the rising edge of the trigger signal respectively.

7. The electronic device of claim 6, wherein the latching module latches the rising edge and the falling edge of the trigger signal for the second preset time according to the clock signal.

8. The electronic device of claim 7, wherein the CPLD further comprises a processing module, the processing module processes the rising edge and the falling edge of the trigger signal after the latching module has latched the second preset time, and outputs the trigger signal to the platform control chip.

9. The electronic device of claim 1, wherein the electronic device is a server.

10. An electronic device comprising:
    a central processing unit (CPU) outputting a trigger signal when a serious error occurs in the electronic device;
    a complex programmable logic device (CPLD) obtaining the trigger signal from the CPU, and delaying the trigger signal for a first preset time; wherein the CPLD comprises a sampling module, the sampling module samples the falling edge and the rising edge of the trigger signal; and
    a platform controller hub (PCH) obtaining the trigger signal delayed by the CPLD, and controlling the electronic device to perform a system restart according to the trigger signal; wherein the electronic device is a server.

11. The electronic device of claim 10, wherein the trigger signal is a 160 ns low pulse signal.

12. The electronic device of claim 10, wherein the first preset time is 500 us.

13. The electronic device of claim 10, wherein the CPLD further comprises a latching module, the latching module latches the falling edge and the rising edge of the trigger signal respectively.

14. The electronic device of claim 13, wherein the CPLD further comprises a counting module, the counting module generates a clock signal of a system clock every second preset time when the latching module latches the falling edge and the rising edge of the trigger signal respectively.

15. The electronic device of claim 14, wherein the latching module latches the rising edge and the falling edge of the trigger signal for the second preset time according to the clock signal.

16. The electronic device of claim 15, wherein the CPLD further comprises a processing module, the processing module processes the rising edge and the falling edge of the trigger signal after the latching module has latched the second preset time, and outputs the trigger signal to the platform control chip.

* * * * *